US008837120B2

(12) United States Patent
Busalt et al.

(10) Patent No.: US 8,837,120 B2
(45) Date of Patent: Sep. 16, 2014

(54) TRANSPARENT DISPLAY FOR HOME APPLIANCES

(75) Inventors: Gerhard Busalt, Altenmarkt/Alz (DE); Joachim Grützke, Egmating (DE); Graham Sadtler, Huntington Beach, CA (US)

(73) Assignee: BSH Home Appliances Corporation, Irvine, CA (US)

( * ) Notice: Subject to any disclaimer, the term of this patent is extended or adjusted under 35 U.S.C. 154(b) by 598 days.

(21) Appl. No.: 12/971,095

(22) Filed: Dec. 17, 2010

(65) Prior Publication Data

US 2012/0154989 A1 Jun. 21, 2012

(51) Int. Cl.
| H05K 7/00 | (2006.01) |
| G09F 23/00 | (2006.01) |
| G09F 9/302 | (2006.01) |
| G09F 9/35 | (2006.01) |
| G06F 3/147 | (2006.01) |

(52) U.S. Cl.
CPC ............ *G09F 23/0058* (2013.01); *G06F 3/147* (2013.01); *G09F 9/3023* (2013.01); *G09F 9/35* (2013.01)
USPC .................................................. 361/679.01

(58) Field of Classification Search
CPC ....... G06F 3/03547; G06F 3/041; G06F 3/14; G06F 3/147; G06F 3/023; G06F 3/038; G06F 13/4072; G06F 2203/04808; G06F 3/011; G06F 3/013; G06F 3/0425; G06F 3/0488; G09F 23/0058; G09F 9/3023
USPC ............. 361/679.02, 679.09, 679.26, 679.21, 361/679.22, 679.01; 349/58–60; 248/917–924
See application file for complete search history.

(56) References Cited

U.S. PATENT DOCUMENTS

| 3,819,906 | A | * | 6/1974 | Gould, Jr. ....................... 219/506 |
| 4,329,581 | A | * | 5/1982 | Helfrich et al. ................ 250/221 |
| 5,808,711 | A | * | 9/1998 | Suppelsa et al. ................. 349/74 |
| 8,451,591 | B2 | * | 5/2013 | Byrne et al. ............. 361/679.01 |

(Continued)

FOREIGN PATENT DOCUMENTS

| EP | 1460609 A2 | 9/2004 |
| EP | WO2010051968 A1 | 5/2010 |
| JP | 2003122286 A | 4/2003 |

OTHER PUBLICATIONS

"Transparent Electroluminescent (EL) Displays"; Planar Systems, Inc. website: http://www.planarembedded.com/whitepapers/assets/wp-Planar-Transparent-EL-Displays.pdf; Abileah et al., Jan. 10, 2008.

*Primary Examiner* — Anthony Haughton
*Assistant Examiner* — Ingrid Wright
(74) *Attorney, Agent, or Firm* — James E. Howard; Andre Pallapies

(57) ABSTRACT

A home appliance includes a front surface having an appearance. A transparent display is disposed on the front surface, and the display has an appearance that matches the appearance of portions of the front surface of the home appliance that are adjacent to the display. The display may be disposed (e.g., mounted) on the exterior of the front surface such that the front surface is visible through the transparent display. Alternatively, the transparent display may be disposed in or behind an aperture in the front surface of the home appliance. In this instance, a trim plate having an appearance that matches the front surface of the home appliance is mounted behind the transparent display, and the trim plate is visible through the transparent display.

24 Claims, 5 Drawing Sheets

(56) References Cited

U.S. PATENT DOCUMENTS

| | | | |
|---|---|---|---|
| 2002/0144845 A1* | 10/2002 | Montagnino et al. | 177/177 |
| 2004/0156170 A1* | 8/2004 | Mager et al. | 361/683 |
| 2007/0184781 A1* | 8/2007 | Huskinson | 455/42 |
| 2008/0285219 A1* | 11/2008 | Podd et al. | 361/681 |
| 2011/0177300 A1* | 7/2011 | Hankey et al. | 428/189 |
| 2011/0261518 A1* | 10/2011 | Krische | 361/679.01 |
| 2012/0125314 A1* | 5/2012 | Alonso Esteban et al. | 126/211 |

* cited by examiner

BACKGROUND

BACKGROUND

TRANSPARENT DISPLAY FOR HOME APPLIANCES

BACKGROUND

Home appliances with displays are known in the art. Displays on a home appliance may include information on functionality to allow a user to control, for example, the temperature of an oven. Displays on a home appliance may also relate certain information, such as the time, to a user.

Conventionally, displays are placed on the front face of a home appliance where it is easily viewed by users. Often, an aperture is formed or cut into a forward facing surface of the body of the home appliance, and the display is mounted inside or behind the hole. Often a transparent window is then placed over the hole, or at least over the front face of the display to protect the display. In the case of an illuminated display, the background of the display window is typically black so that the displayed information is easy to view. In the case of an LCD type display, the background of the display window may be lightly colored, or illuminated, such that the displayed information is easily viewed.

SUMMARY

A portion of a conventional oven 100 with a display is shown in FIG. 1. The oven includes a front panel 106. The front panel 106 may be made from a colored or textured material. In the embodiment illustrated in FIG. 1, the surface of the front panel 106 is textured. A control dial 104 is provided to control functionality in the oven 100, such as the temperature in the oven cavity. A display 102 is placed behind a window cut into the front panel 106. As can be seen, because of the differences in visual appearance of the material that makes up the front panel 106, and the visual appearance of the background of the display, even when no text or graphical information is being displayed, the appearance of the front panel 106 is interrupted by the area occupied by the display 102.

FIG. 2 shows a conventional electroluminescent (EL) display. EL display 200 includes a frame 202 that acts to both support a translucent layer 206 and hide the electrical connections provided to the translucent layer. The frame 202 may also assist in mounting the EL display 200 onto an external structure. The translucent layer 206 may include a series of characters 204 that are visible when provided with power. In some displays, the characters in the display may be visible, even when no power is being applied to cause information to be displayed. A stand 208 is also provided to hide electrical connections to an outside energy source (e.g., a battery or AC connection).

One aspect of the technology herein may be embodied in a home appliance having a body with an exterior surface, where a transparent display is disposed on, behind, or flush with the exterior surface of the home appliance. The appearance of the exterior surface and the transparent display substantially match when no information is displayed on the transparent display.

In certain embodiments, a trim element is disposed behind the transparent display. The front surface of the trim element is designed to mimic the appearance of the front surface of the home appliance where the display is disposed. The trim plate is being visible through the transparent display when no information is being displayed.

In certain embodiments, a transparent display configured to display information to a user is provided. The transparent display is mounted on a surface of a home appliance. When no information is being displayed, the surface of the home appliance behind the display is visible such that the appearance of the display matches an appearance of portions of the surface of the home appliance adjacent to the display.

In some examples, a transparent display is mounted behind an exterior surface of a home appliance such that electrical leads disposed within a transparent display are hidden behind the exterior surface of the body.

In some examples, the exterior surface of a home appliance is colored. In these examples, a trim plate mounted behind a transparent display has the same color as the exterior surface so that when no information is being displayed, the colored trip plate will be visible through the display.

In some examples, a transparent display is disposed within an aperture of an external surface of a body of a home appliance such that the front surface of the transparent display is flush with the front surface of the external surface.

DETAILED DESCRIPTION

The various embodiments and/or examples described herein may be implemented in conjunction with other embodiments, e.g., aspects of one embodiment may be combined with aspects of another embodiment to realize yet further embodiments. Independent features or components of a given assembly may constitute additional embodiments.

Figure 1:
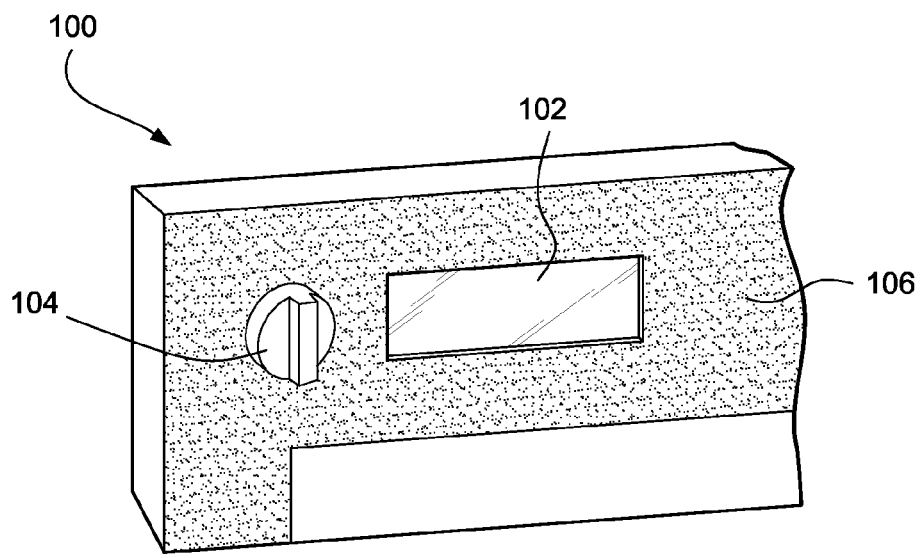
FIG. 1 illustrates a portion of an oven with a conventional display.
Figure 2:
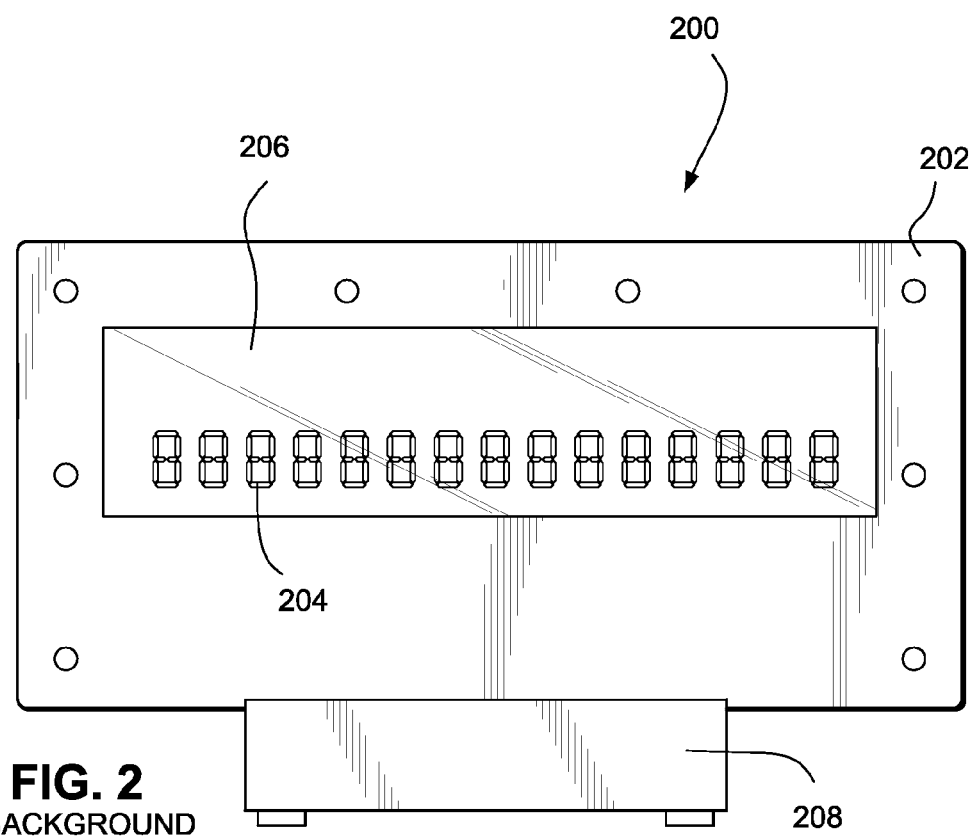
FIG. 2 illustrates a conventional electroluminescent display.
Figure 3:
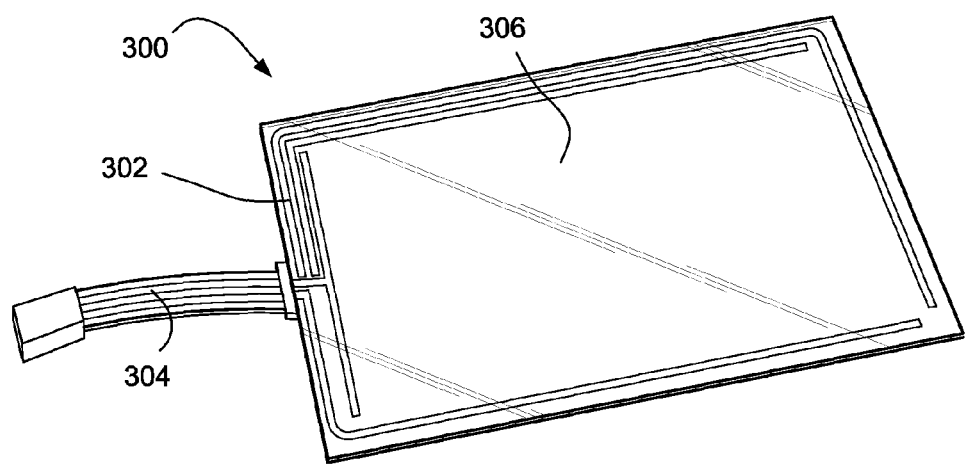
FIG. 3 illustrates a display for use in home appliances in accordance with one example of the present technology.

FIG. 3 shows a transparent display for use with home appliances in accordance with examples of the present technology. The transparent display 300 includes a ribbon connector 304 that is designed to interface with a controller (e.g., to provide power and control what is displayed). The transparent display 300 includes a series of electrical connections 302 disposed on or in the transparent display 300. The connections 302 are routed around the edges of the display. Electrical connections 302 may be visible through ordinary observation (e.g., a person looking at the display) or the electrical connections 302 may be relatively invisible (e.g., because of the size or material used for the connections).

In FIG. 3 the transparent display 300 is shown in a non-powered condition, consequently no data is displayed. In certain examples, when no data is being displayed, the transparent display may be essentially transparent. In other embodiments, when no data is being displayed, certain display locations may be partially visible.

Figure 4A:
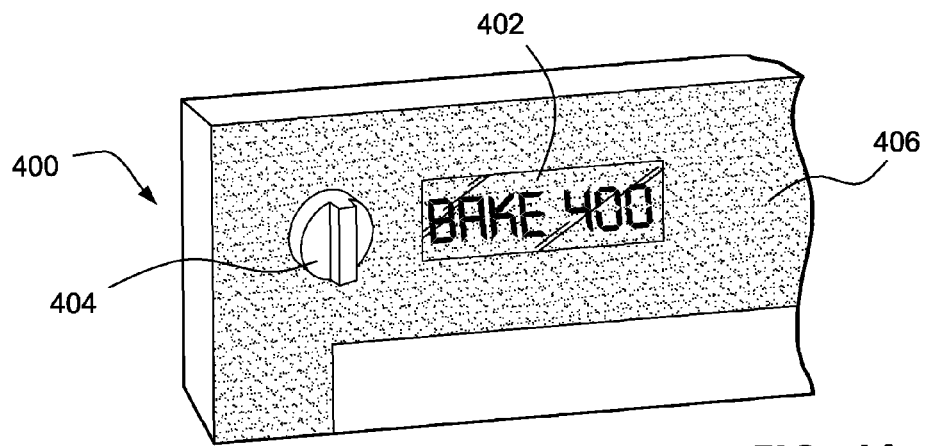
FIG. 4A is an exemplary view of a portion of a home appliance displaying information on a transparent display.

FIG. 4A shows an example where an oven 400 includes a front face 406 constructed out of a material suitable for use on home appliances. In this example, the front face 406 is textured. For instance, the front face 406 may be brushed stainless steel. In certain examples, the front face 406 could be painted or anodized to have a particular color (e.g., painted metal). In certain examples, both texture and color elements could be provided in a particular pattern.

The oven 400 shown in FIG. 4A also includes a control dial 404 that is used to control the functionality (e.g., oven temperature) of the oven 400. The front face 406 also includes a display 402. In FIG. 4A, the display 402 is in a first display mode and displays "Bake 400" to indicate that the oven 400 is set to bake at 400 degrees Fahrenheit.

In certain examples an oven may include a heating element (e.g., a burner) disposed on a lower portion of a cooking cavity in the oven. The heating element disposed on a lower portion of the cooking cavity may facilitate the baking or roasting of food placed into the oven. Alternatively, or in addition, an oven may include a heating element disposed on a top portion of the cooking cavity. Such an upper heating element may allow food placed into the oven to be "broiled". An oven may include a fan disposed in contact with the cooking enclosure to facilitate the movement of hot air around the cooking enclosure. This convection process may speed up the cooking of food placed into an oven.

The heating elements for an oven may be hooked up to an electrical grid or may be connected to another heating source such as natural gas, propane, or the like. The heat provide by heating elements disposed in a cooking cavity of an oven may be controlled by a thermostat provided on an outer surface of the oven. Accordingly, users may control the temperature of the cooking cavity. Control of temperature or other oven functionality (e.g., whether the upper broiler burners are on) may be provided by mechanical switches, electrical connections, or the like. Control may be presented to the user in the form of mechanical dials, a touch screen, etc. In certain instances (e.g., an oven with a touch screen) the oven may require an electrical connection to power certain features of the oven.

In certain examples an oven may include a timer that allows timed control of oven functionality. For example, an oven may have a timer that sets the oven to "bake" at 425° for 30 minutes. After 30 minutes the timer may automatically cause the oven to turn off. In certain examples an oven may include preset cooking times for a variety of different types of food (e.g., 350° for 15 minutes for steak or 425° for 12 minutes for salmon).

Certain example ovens may include an auto-clean functionality. One technique for accomplishing this is to oxidize the organic matter in the cooking cavity through use of extreme heat (e.g., at a temperature in excess of 500° F.).

In other examples an oven may be a microwave oven that uses microwave radiation to heat food. An example microwave oven may include a magnetron used to convert electrical energy into microwave radiation. In certain examples a microwave oven may include a stirrer and/or a turntable to facilitate even distribution of microwave energy. In certain examples a microwave oven may also include a convection process.

The subject technology may also be applied to other types of home appliances. For example another type of home appliance is a dishwasher. In examples, a dishwasher may be connected to a water source. In certain examples a dishwasher may include a heating element for heating items within the dishwasher to speed up the drying process after the items have been washed.

In certain examples a home appliance (e.g., an oven or a clothes dyer) may require electrical power at a higher than normal household voltage. For example, an electrical connection of 240V may be preferred or required over a standard 120V connection.

Figure 4B:
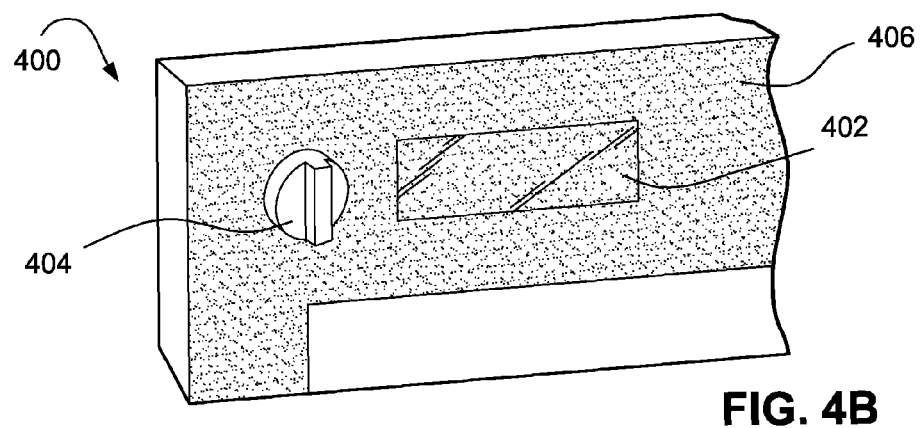
FIG. 4B is an exemplary view of a portion of the home appliance shown in FIG. 4A when no information is being displayed on the transparent display.
Figure 5:
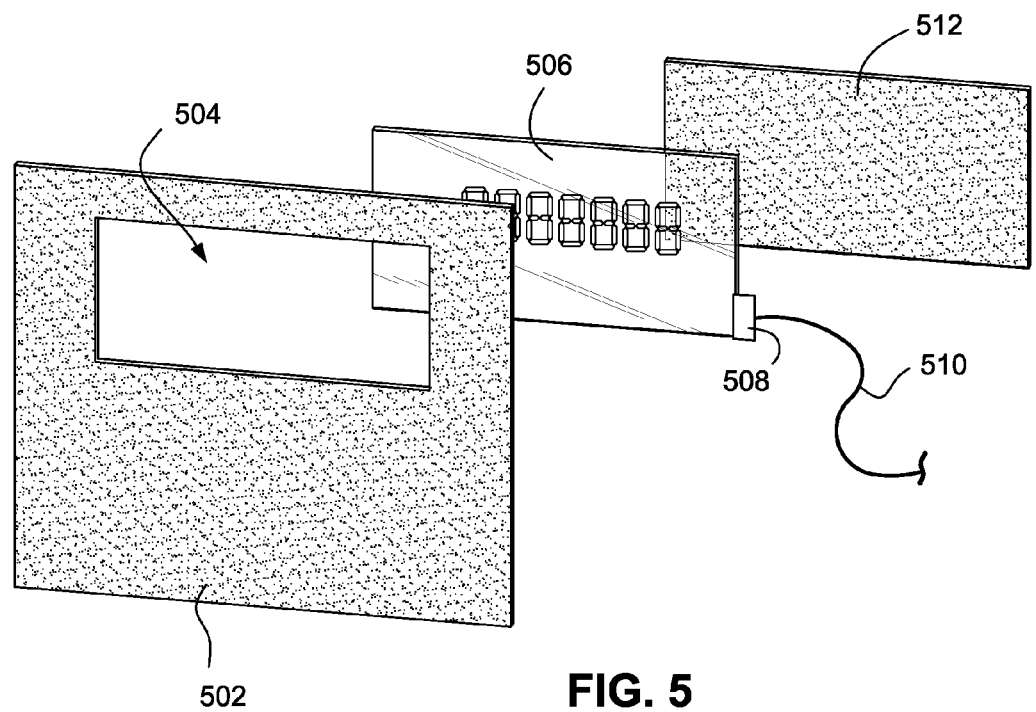
FIG. 5 is an exploded view illustrating how elements of a transparent display are disposed on a panel of a home appliance.

FIG. 5 shows how a display as illustrated in FIGS. 4A and 4B may be constructed. As illustrated in FIG. 5, a hole or aperture 504 is formed in a plate of material 502 which will become the front face of a home appliance. The plate 502 is composed of a material suitable for use on a home appliance. In this instance, the plate 502 is shown with a textured front surface. As mentioned above, the plate 502 might also be painted or anodized so that it has a certain color.

A transparent display 506 is mounted behind the plate 502 and aligned with the gap 504. The transparent display 506 includes an electrical connection point 508 that connects an electrical lead 510 to the transparent display 506. The electrical lead 510 may then be connected to a control system. The transparent display 506 is arranged such that any electrical leads on the edges of the display 506 are hidden behind the plate 502. As a result, only the transparent display portions of the display 506 are visible through the aperture 504 in the plate 502.

A trim element 512 is disposed behind the transparent display 506. The trim element 512 may be a plate that has a surface texture and/or color that matches the texture and/or color on the front of the plate 502. As a result, when no information is being displayed on the display 506, the texture and/or color of the trim element 512 will be visible through the transparent display 506. Thus, the appearance of the display may match or mimic the appearance of the surrounding portions of the plate 502.

In certain examples, the transparent display may be disposed within the aperture 504 such that the front surface of the transparent display is relatively flush with the front surface of the plate 502.

Returning to FIG. 4A, because the display element is transparent, the trim plate located behind the display element will be visible, even when information is presented on the display, as shown in FIG. 4A. The background in the display 402 will match the texture and/or color of the surrounding portions of the front face 406 of the home appliance. Further, when the display 402 is not presenting any information, as shown in FIG. 4B, the matching trim plate behind the display element will be fully visible in the display 402 so that the entire display visually matches the surrounding portions of the front face 406 of the home appliance. Accordingly, when information is displayed through the display 402, the displayed information may appear to be provided directly on the material of the front face 406 instead of on a separate and discrete display panel.

In examples, the outline of display 402 may not be visible to an ordinary user. In other words, the display may blend into the background material of the front face. Thus, for example, when the display is not in use, it may appear that there is no display on the front face of the home appliance. In certain examples, a discrete outline around the display may be visible at all times, so that the display location may be more ascertainable by a user.

While the display in FIGS. 4A and 4B is located in the upper left corner of the front face of a home appliance, in examples the display may be disposed at other locations on a home appliance. For example, the display may be located on a top or side surface of the home appliance, etc. Additionally, the display may be in different shapes other than a rectangle (e.g., a circle, a triangle, etc). In certain examples, the control dial 404 may be removed and its functionality incorporated into the functionality provided by the display 402.

Figure 6:
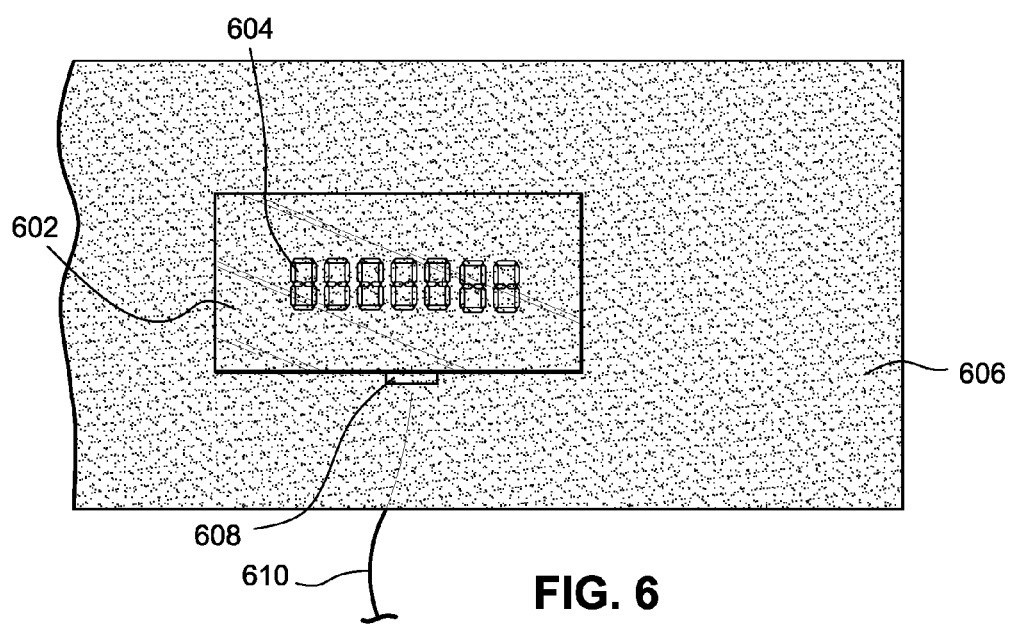
FIG. 6 illustrates another embodiment of a transparent display disposed in front of a panel of a home appliance.

In the example illustrated in FIG. 6, a transparent display 602 is disposed on the front face 606 of a body of a home appliance. The front face 606 may be constructed out of any suitable material, and it may be textured and/or colored, as described above.

Here again, the transparent display 602 may be configured to present information to a user on a display area. A connection at a point covered by covering 608 is located on the bottom of the display 602. An electrical lead may penetrate through the front face 606 behind the covering 608 and run to a controller. In this instance, a small gap may be provided through the front face 606 to allow the electrical lead to be fed into the inner portion of the home appliance body. The cover 608 may be provided to seal or cover the gap created through the body. The cover 608 may be constructed so that it has the same appearance as the material provided on the front face 606. Thus, as seen in FIG. 6, the appearance of the front face 606 will match the appearance of the cover 608.

When a transparent display 602 is mounted on the front face 606 of a home appliance body as illustrated in FIG. 6, the front face of the home appliance will appear uniform. When no information is displayed, the display 602 may not even be visible. When information is displayed, the information will appear to be presented on the front face of the home appliance itself. Even when the outer edges of the display are visible, the basic appearance of the front face of the home appliance will be substantially uniform.

In certain examples, a light source may be provided to illuminate the transparent display and information displayed thereon. In certain examples, the light source may be provided separately and disposed in proximity to the transparent display (e.g., behind the display, around the edges of the display, etc). In certain examples, a light source may be integrated into the transparent display (e.g., as a backlight or the like).

Figure 7A:
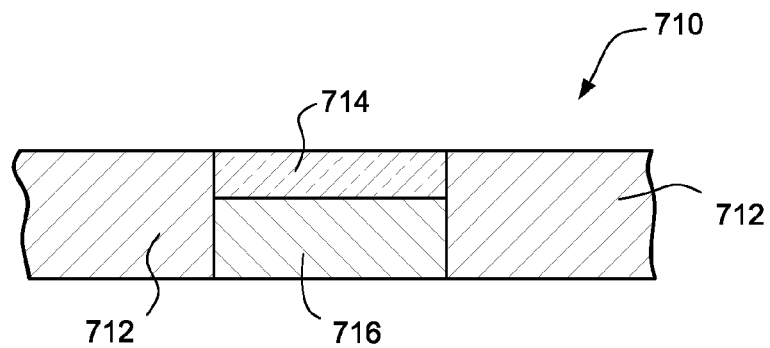
FIGS. 7A-7H illustrate cross-sectional views that show portions of example home appliances with example transparent displays.

FIGS. 7A-7G illustrate cross-sectional views that show portions of example home appliances with example transparent displays. In the example of FIG. 7A a portion of a home appliance 710 with a front panel 712 that includes a cutout portion (e.g., an aperture) is shown. A display 714 is disposed into the cutout portion of the front panel 712. Adjacent or affixed to the back of the display 714 is a trim plate 716. It will be appreciated that the sum of the thicknesses of the display 714 and the trim plate 716 may be roughly equal to the thickness of the front panel 712.

Figure 7B:
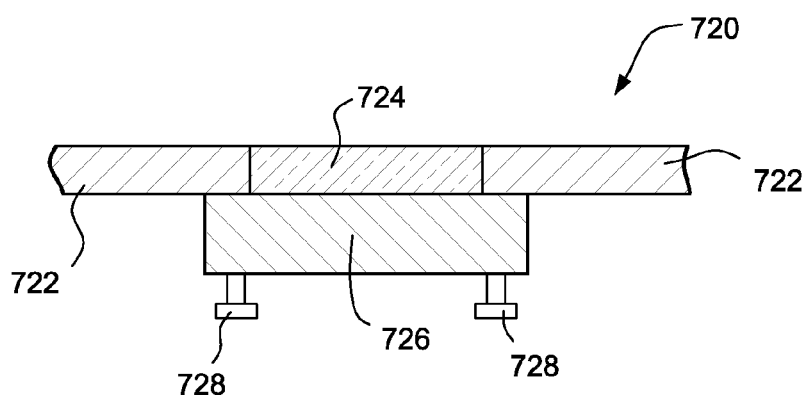

In FIG. 7B a portion of a home appliance 720 is shown with a front panel 722. The front panel 722 includes a cutout portion with a display 724 disposed therein. In this example, the thickness of the display is roughly equal to the thickness of the front panel 722. Backing the display 724 and the front panel 722 is a trim plate 726. The trim plate 726 may be held in place by mounting brackets 728. The trim plate 726 may be wider than the display panel 724 such that the trim plate 726 is both directly behind the display 724 and portions of the front panel 722.

In certain examples the display and/or trim plate may be held in place through mounting brackets, glue (or other adhesives), welding, soldering, taping, friction, gravitational force, etc. In certain examples a trim plate may be made out of a material that is the same the material of the front panel of a home appliance. In certain examples the material of a trim plate may be a material that is different from the material of the front panel, but which has the same or a similar appearance as the front panel (e.g., painted to look like the front panel).

Figure 7C:
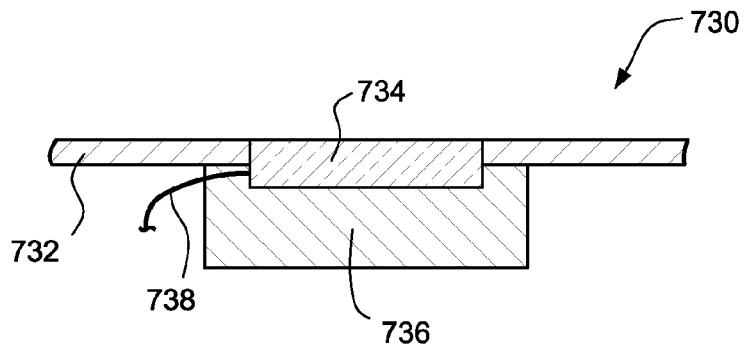

In FIG. 7C a portion of a home appliance 730 is shown with a front panel 732. In this example a display 734 is disposed on a cutout of the front panel 732 and is thicker than the front panel 732. A trim plate 736 is disposed behind and around a portion of the display 734. Thus, in this example, the trim plate 736 encompasses a portion of the display 734 on three sides. An electrical lead 738 is disposed such that it can be hooked into the control system of the home appliance 730 (e.g., to control temperature in an oven, or to provide power to the display 734).

It will be appreciated that in certain examples a user looking through the display 734 at an angle may see still see the same appearance as front panel 732 because the trim plate 736 in conjunction with the front panel 732 encompasses the display on three sides.

Figure 7D:
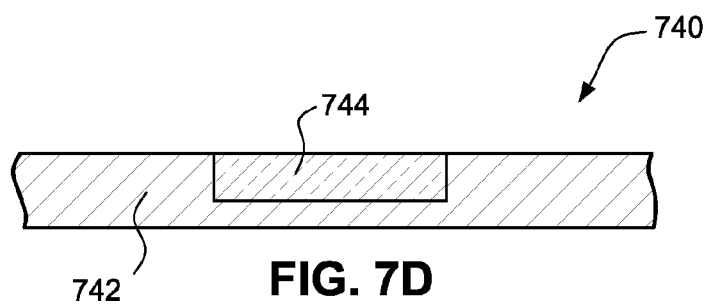

In FIG. 7D a portion of a home appliance 740 is shown with a front panel 742. A display 744 is disposed into the front panel 742. It will be appreciated that in this example no trim element (e.g., plate) is provided as the front panel 742 backs the display 744. In certain examples the texture and/or appearance of the front panel 742 may be mimicked by the display disposed onto, within, or behind. For example, a multilayered display may be constructed such that the background of the display matches the background of the front panel of a home appliance.

Figure 7E:
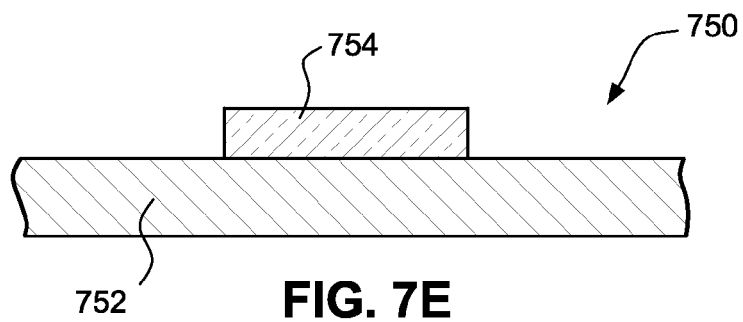

In FIG. 7E a portion of a home appliance 750 is shown with a front panel 752. Here a display 754 is disposed onto a surface of the front panel 752.

Figure 7F:
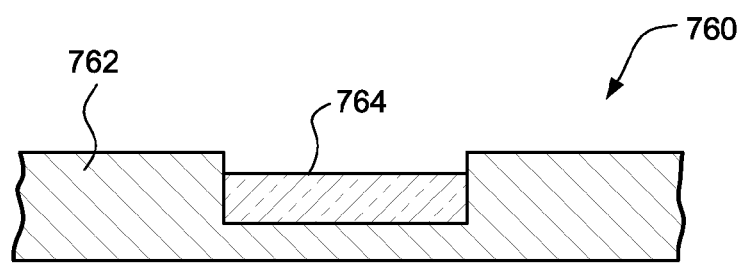

In FIG. 7F a portion of a home appliance 760 is shown with a front panel 762. In this example, the front panel 762 includes a hollowed out portion into which a display 764 is disposed. The display 764 may be slightly recessed (e.g., not flush) to the front surface of the front panel 762.

Figure 7G:
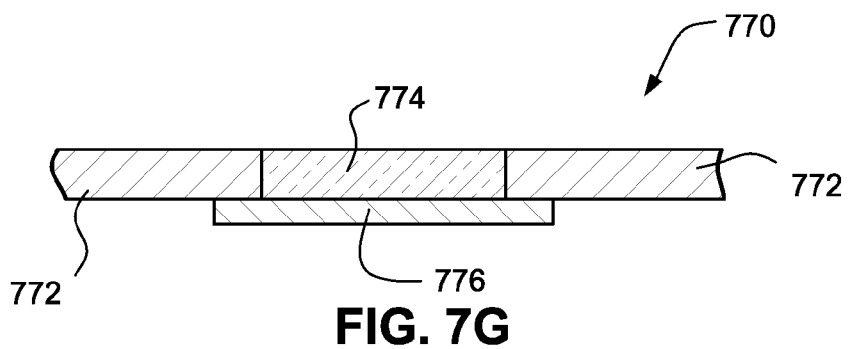

In FIG. 7G a portion of a home appliance 770 is shown with a front panel 772. A display 774 is disposed into a cutout portion of the front panel 772. Behind the display may be a sticker 776 that is mounted to mimic the appearance of front panel 772.

In certain examples the display may protrude from a hollowed out or cutout portion of a panel (e.g., extending out from the front panel as in the example shown in FIG. 7E, and also be disposed in a hollowed out portion as in example in FIG. 7F).

In certain examples a display may be provided on other surfaces of a home appliance, such as, for example, a top surface or panel.

Figure 7H:
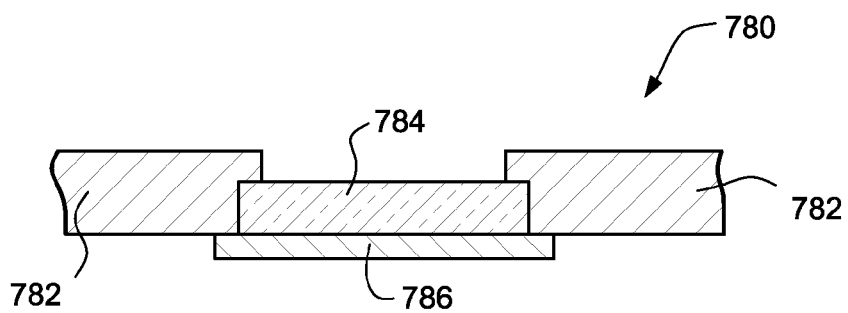

In FIG. 7H a portion of a home appliance 780 is shown with a front panel 782. A display 784 is disposed into a cutout portion of the front panel 782. A portion of the display 784 is disposed behind the front panel 782 such that the portion is not visible from the front of the display 784. Behind the display 784 is a trim plate 786. It will be appreciated that electrical leads, etc may be connected to the display 784 such that users of display may not see the connection points (e.g., because the connection points are behind the front panel 782).

While the above-described examples may be related to an oven, the techniques described herein may be applied to other types of appliances. For instance, a transparent display may be applied to a microwave oven, an ice maker, a dishwasher, a refrigerator and/or freezer, a clothing washer, a clothing dryer, a trash compactor or on any other typical household or commercial appliance that includes a display.

While the invention has been described in connection with what are presently considered to be the most practical and preferred examples, it is to be understood that the invention is not to be limited to the disclosed examples, but on the contrary, is intended to cover various modifications and equivalent arrangements.

What is claimed is:

1. A home appliance, comprising:
    a body having an exterior surface that includes a first appearance;
    a transparent display disposed on, behind, or flush with the exterior surface of the body, a display portion of the transparent display configured to display information and being substantially transparent when no information is being displayed; and
    a trim element behind the transparent display such that a front surface of the trim element has a second appearance that substantially matches the first appearance of the exterior surface of the body and is visible through the transparent display,
    wherein an appearance of the display portion of the transparent display substantially matches the first appearance of the exterior surface when no information is being displayed.

2. The home appliance of claim 1, wherein the transparent display is disposed on a front of the exterior surface such that when no information is being displayed the first appearance of the exterior surface is visible through the display portion of the transparent display, wherein the trim element is part of the exterior surface.

3. The home appliance of claim 1, wherein an aperture is located in the exterior surface, wherein the transparent display is mounted behind the aperture such that at least the display portion of the transparent display is visible through the aperture, wherein the trim element is mounted behind the transparent display.

4. The home appliance of claim 3, wherein a front surface of the trim element that abuts or is adjacent to a rear surface of the transparent display.

5. The home appliance of claim 4, further comprising one or more electrical leads disposed in the transparent display that are hidden behind the exterior surface of the body.

6. The home appliance of claim 4, wherein the exterior surface of the body is textured, and wherein the front surface of the trim element has a texture that substantially matches the texture of the exterior surface of the body.

7. The home appliance of claim 4, wherein the exterior surface of the body is colored, and wherein the front surface of the trim element is colored substantially the same as the exterior surface of the body.

8. The home appliance of claim 1, wherein an aperture is located in the exterior surface, wherein the transparent display is disposed within the aperture.

9. The home appliance of claim 8, wherein a front surface of the trim element that abuts or is adjacent to a rear surface of the transparent display has a second appearance that substantially matches the first appearance of the exterior surface of the body.

10. The home appliance of claim 9, wherein a front surface of the transparent display is substantially flush with a front surface of the exterior surface of the body.

11. The home appliance of claim 9, wherein the exterior surface of the body includes a texture, and wherein the front surface of the trim element has a texture that substantially matches the texture of the exterior surface of the body.

12. The home appliance of claim 9, wherein the exterior surface of the body is colored, and wherein the front surface of the trim element is colored substantially the same as the exterior surface of the body.

13. The home appliance of claim 1, wherein the exterior surface with the first appearance is opaque.

14. The home appliance of claim 1, further comprising:
    a controller configured to control information that is output to the transparent display; and
    a heating element configured to provide heat to the home appliance and/or transfer heat from the home appliance.

15. The home appliance of claim 1, further comprising:
    a controller configured to control information that is output to the transparent display; and
    a heating element configured to transfer heat from the home appliance.

16. A display for use in a home appliance, the display comprising:
    a transparent display portion that is configured to display information to a user; and
    a trim element disposed behind the transparent display,
    wherein a front surface of the trim element is disposed adjacent to a rear surface of the transparent display and has an appearance that is designed to mimic the appearance of a front surface of the home appliance in which the display is disposed, and wherein the front surface of the trim element is visible through the transparent display.

17. The display of claim 16, wherein the front surface of the trim element has a texture that is designed to mimic the texture of a front surface of the home appliance in which the display is disposed.

18. The display of claim 16, wherein the front surface of the trim element has a color that is designed to mimic the color of a front surface of the home appliance in which the display is disposed.

19. The display of claim 16, wherein the appearance of the front surface of the home appliance is opaque.

20. A method of mounting a display on a home appliance, the method comprising:
    providing a transparent display configured to display information to a user;
    mounting the transparent display on a surface of the home appliance such that an appearance of the display matches an appearance of portions of the surface of the home appliance adjacent to the display; and
    mounting a trim element behind the transparent display,
    wherein a front surface of the mounted trim element that is visible through the mounted transparent display has an appearance that substantially matches the appearance of portions of the surface of the home appliance adjacent to transparent display.

21. The method of claim 20, wherein mounting further comprises mounting the transparent display on an outer side of the surface of the home appliance such that the surface of the home appliance is behind the transparent display and is visible through the transparent display.

22. The method of claim 20, further comprising:
    wherein mounting the transparent display further comprises mounting the transparent display behind an aperture in the surface of the home appliance.

23. The method of claim 20, further comprising:
    wherein mounting the transparent display further comprises mounting the transparent display in an aperture in the surface of the home appliance.

24. The method of claim 20, wherein the appearance of portions of the surface of the home appliance adjacent to the display is an opaque appearance.

* * * * *